US012149677B2

(12) United States Patent
Schroeder et al.

(10) Patent No.: US 12,149,677 B2
(45) Date of Patent: Nov. 19, 2024

(54) REFRIGERATOR CAMERA MODULES AND METHODS FOR ADDRESSING PERSISTENT CONDITIONS ON THE CAMERA LENS (71) Applicant: Haier US Appliance Solutions, Inc., Wilmington, DE (US)

(72) Inventors: Michael Goodman Schroeder, Louisville, KY (US); Stephanos Kyriacou, Louisville, KY (US)

(73) Assignee: Haier US Appliance Solutions, Inc., Wilmington, DE (US)

( * ) Notice: Subject to any disclaimer, the term of this patent is extended or adjusted under 35 U.S.C. 154(b) by 256 days.

(21) Appl. No.: 17/705,642

(22) Filed: Mar. 28, 2022

(65) Prior Publication Data
US 2023/0308632 A1 Sep. 28, 2023

(51) Int. Cl.
*H04N 7/18* (2006.01)
*F25D 11/00* (2006.01)
*G06T 7/00* (2017.01)
*H04N 17/00* (2006.01)

(52) U.S. Cl.
CPC .......... *H04N 17/002* (2013.01); *F25D 11/00* (2013.01); *G06T 7/0002* (2013.01); *H04N 7/188* (2013.01); *F25D 2400/36* (2013.01); *F25D 2700/02* (2013.01); *G06T 2207/30168* (2013.01)

(58) Field of Classification Search
CPC ...... H04N 17/002; H04N 7/188; F25D 11/00; F25D 2400/36; F25D 2700/02; G06T 7/0002; G06T 2207/30168

USPC .......................................................... 348/143
See application file for complete search history.

(56) References Cited

U.S. PATENT DOCUMENTS

| 9,429,925 | B2 * | 8/2016 | Wait ....................... G05B 15/02 |
| 10,365,671 | B1 * | 7/2019 | Nelson .................. G05B 15/02 |
| 10,389,980 | B2 | 8/2019 | Izawa et al. |
| 10,951,863 | B2 | 3/2021 | Marutani et al. |
| 11,122,203 | B1 * | 9/2021 | Schroeder ............... H04N 7/18 |

FOREIGN PATENT DOCUMENTS

| CN | 112944791 A | 6/2021 |
| JP | 6910113 B2 | 7/2021 |
| KR | 20190047243 A | 5/2019 |
| WO | WO2018033956 A1 | 2/2018 |

* cited by examiner

*Primary Examiner* — Trang U Tran
(74) *Attorney, Agent, or Firm* — Dority & Manning, P.A.

(57) ABSTRACT

A refrigerator appliance may include a cabinet, a door, a camera module, and a controller. The cabinet may define a chilled chamber. The door may be rotatably hinged to the cabinet to provide selective access to the chilled chamber. The camera module may be mounted to the cabinet within the chilled chamber. The controller may be operably coupled to the camera module. The controller may be configured to initiate an operation routine. The operation routine may include receiving one or more images for each of a plurality of capture sequences, detecting a pervasive obfuscation condition at the camera module based on the received one or more images, and directing a responsive action on the refrigerator appliance in response to detecting the pervasive obfuscation condition.

19 Claims, 6 Drawing Sheets

REFRIGERATOR CAMERA MODULES AND METHODS FOR ADDRESSING PERSISTENT CONDITIONS ON THE CAMERA LENS

FIELD OF THE INVENTION

The present subject matter relates generally to systems and methods for preventing persistent conditions from obscuring a line of sight of a camera, particularly for a camera in a refrigerator appliance.

BACKGROUND OF THE INVENTION

Storage enclosures, such as refrigerator appliances and pantries, generally provide an enclosed chamber for receiving multiple items or objects. For example, refrigerator appliances generally include a cabinet that defines a chilled chamber. A user can place food items or objects within the chilled chamber in order to hinder perishing of such food items. Thereby, a useable life of perishable items or objects can be increased.

Over time, a large volume or number of stored items (e.g., food items) can accumulate within the refrigerator's chilled chamber. As stored items accumulate, users of the refrigerator appliance can have difficulty identifying the items located within the refrigerator appliance. Additionally, users can have difficulty determining a quantity of certain items within the refrigerator appliance. This is especially true when multiple users add/remove items from a common refrigerator appliance without communicating with other users. Consequently, the users may accidentally purchase excessive or undesired items. For example, certain food items do not readily perish within the chilled chamber, and such food items may be consumed infrequently. Thus, such food items can remain within the chilled chamber for extended periods of time. The users can forget about such food items and purchase replacements despite already having acceptable items. In such a manner, the users can be inconvenienced or spend money needlessly. Additionally or alternatively, some users may be unaware that certain items have been removed or consumed. Thus, users may fail to replace or replenish such items.

Existing systems have attempted to address these issues by providing a camera within the chilled chamber of the refrigerator appliance (e.g., to view or track the contents of the chilled chamber). Nonetheless, use of a camera within a chilled chamber creates additional issues. In particular, rapid changes in air temperature or moisture content (e.g., caused by the opening/closing of a door) can result in condensation (i.e., fog) accumulating on surfaces of the chilled chamber. For instance, moisture may condensate on a lens of the camera module, blocking or otherwise obscuring the camera's line of sight and generally degrading performance. Additionally or alternatively, dirt or grime may accumulate on the lens, which may also obscure the camera's line of sight and degrade performance. Nonetheless, it may be difficult for a user to know when or how to address such persistent obfuscating conditions, especially if they persist over time.

Accordingly, a method or refrigerator appliance having features for identifying and addressing persistent obfuscating along a line of sight of a camera would be useful.

BRIEF DESCRIPTION OF THE INVENTION

Aspects and advantages of the invention will be set forth in part in the following description, or may be obvious from the description, or may be learned through practice of the invention.

In one exemplary aspect of the present disclosure, a refrigerator appliance is provided. The refrigerator appliance may include a cabinet, a door, a camera module, and a controller. The cabinet may define a chilled chamber. The door may be rotatably hinged to the cabinet to provide selective access to the chilled chamber. The camera module may be mounted to the cabinet within the chilled chamber. The controller may be operably coupled to the camera module. The controller may be configured to initiate an operation routine. The operation routine may include receiving one or more images for each of a plurality of capture sequences, detecting a pervasive obfuscation condition at the camera module based on the received one or more images, and directing a responsive action on the refrigerator appliance in response to detecting the pervasive obfuscation condition.

In another exemplary aspect of the present disclosure, a method of operating a refrigerator appliance is provided. The method may include receiving one or more images for each of a plurality of capture sequences. The method may further include detecting a pervasive obfuscation condition at a camera module based on the received one or more images. The method may still further include directing a responsive action on the refrigerator appliance in response to detecting the pervasive obfuscation condition.

In yet another exemplary aspect of the present disclosure, a method of operating a refrigerator appliance is provided. The refrigerator appliance may include a cabinet, a door, a camera module, and a controller. The cabinet may define a chilled chamber. The door may be rotatably hinged to the cabinet to provide selective access to the chilled chamber. The camera module may be mounted to the cabinet within the chilled chamber. The controller may be operably coupled to the camera module. The controller may be configured to initiate an operation routine. The operation routine may include receiving a first image from the camera module, detecting an obfuscation condition at the camera module based on the received first image, initiating an anti-fog capture sequence at the camera module, detecting an open-door event, receiving a second image from the camera during the open-door event, reevaluating the obfuscation condition based on the received second image, and directing a responsive action based on the reevaluation.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures.

DETAILED DESCRIPTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope of the invention. For instance, features illustrated or described as part of one embodiment can be used with another embodiment to yield a still further embodiment. Thus, it is intended that the present invention covers such modifications and variations as come within the scope of the appended claims and their equivalents.

As used herein, the term "or" is generally intended to be inclusive (i.e., "A or B" is intended to mean "A or B or both"). The terms "first," "second," and "third" may be used interchangeably to distinguish one component from another and are not intended to signify location or importance of the individual components. Furthermore, as used herein, terms of approximation, such as "approximately," "substantially," or "about," refer to being within a ten percent margin of error.

Generally, the present disclosure provides systems and methods to detect and address when the lens of a camera module is covered in a low-temperature environment, such as a refrigerator chilled chamber. For instance, accumulated condensation, dirt, or grime might obscure the camera. The systems and methods automatically detect such conditions without any direct user input or knowledge. Moreover, the systems and methods may act to mitigate such conditions (e.g., without direct user input) or guide a user in how the conditions may be addressed.

Figure 1:
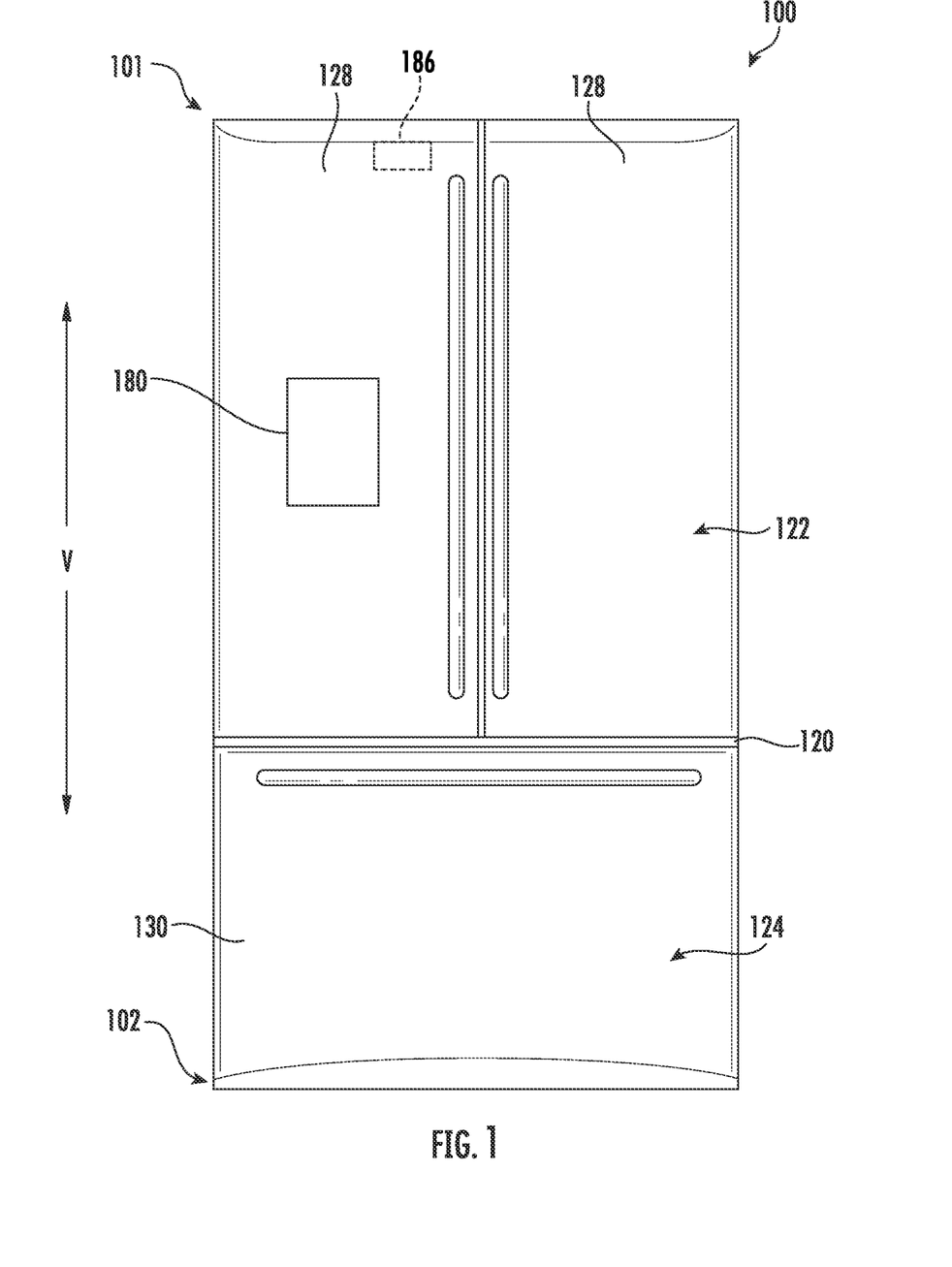
FIG. 1 provides a front elevation view of a refrigerator appliance according to exemplary embodiments of the present disclosure.
Figure 2:
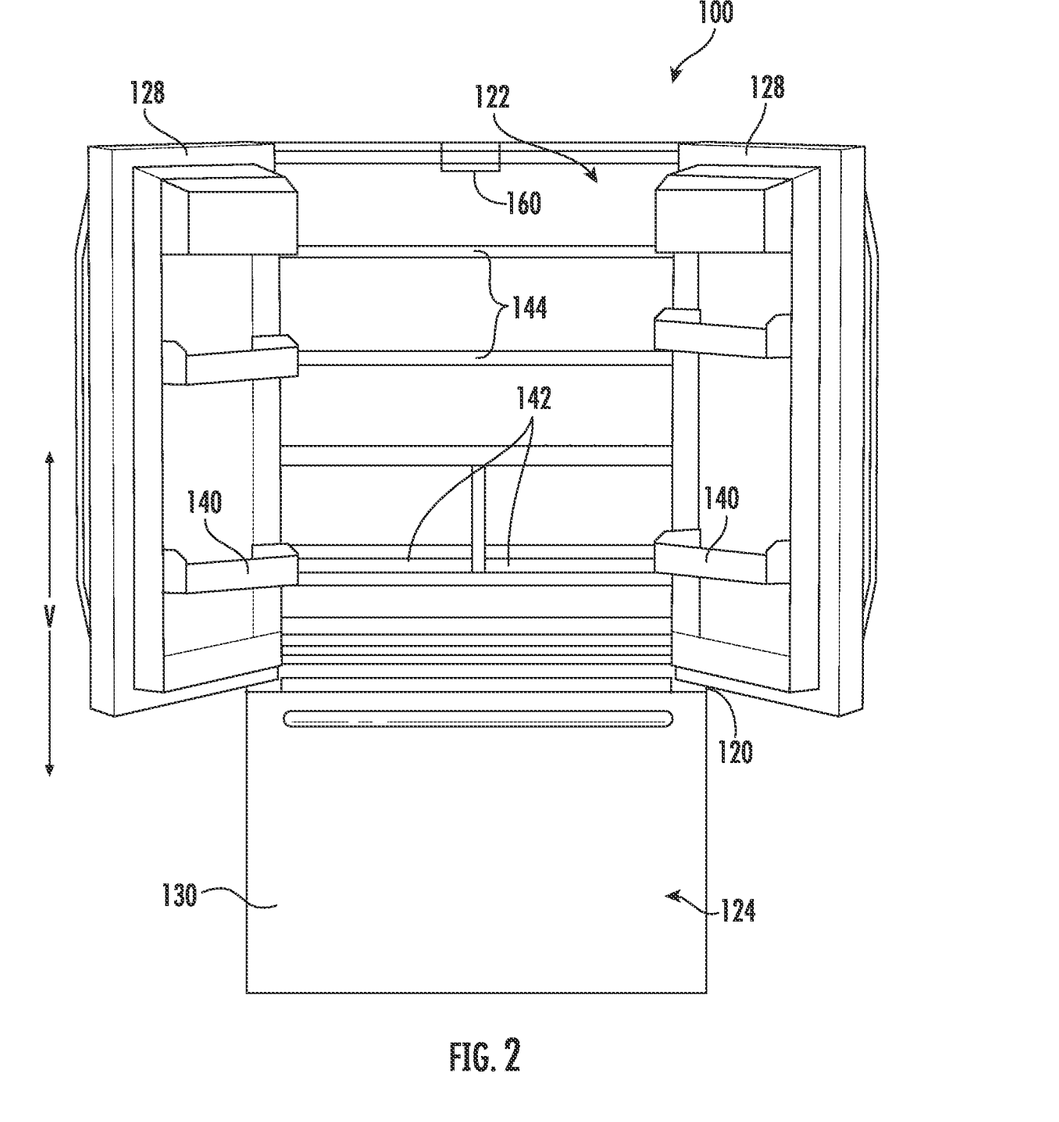
FIG. 2 provides a front elevation view of a refrigerator appliance according to exemplary embodiments of the present disclosure, wherein refrigerator doors are shown in an open position.

Turning now to the figures, FIG. 1 provides a front elevation view of a refrigerator appliance 100 according to exemplary embodiments of the present disclosure with refrigerator doors 128 of the refrigerator appliance 100 shown in a closed position. FIG. 2 provides a front view elevation of refrigerator appliance 100 with refrigerator doors 128 shown in an open position to reveal a fresh food chamber 122 of refrigerator appliance 100.

Refrigerator appliance 100 includes a housing or cabinet 120 that extends between a top 101 and a bottom 102 along a vertical direction V. Cabinet 120 defines chilled chambers for receipt of food items for storage. In particular, cabinet 120 defines fresh food chamber 122 positioned at or adjacent top 101 of cabinet 120 and a freezer chamber 124 arranged at or adjacent bottom 102 of cabinet 120. As such, refrigerator appliance 100 is generally referred to as a bottom mount refrigerator. It is recognized, however, that the benefits of the present disclosure apply to other types and styles of storage enclosure, such as a top mount refrigerator appliance, a side-by-side style refrigerator appliance, etc. Consequently, the description set forth herein is for illustrative purposes only and is not intended to be limiting in any aspect to any particular storage enclosure or refrigerator chamber configuration.

Refrigerator doors 128 are rotatably hinged to an edge of cabinet 120 for selectively accessing fresh food chamber 122. In addition, a freezer door 130 is arranged below refrigerator doors 128 for selectively accessing freezer chamber 124. Freezer door 130 is coupled to a freezer drawer 142 (not shown) slidably mounted within freezer chamber 124. As discussed above, refrigerator doors 128 and freezer door 130 are shown in the closed configuration in FIG. 1, and refrigerator doors 128 are shown in the open position in FIG. 2.

In some embodiments, various storage components are mounted within fresh food chamber 122 to facilitate storage of food items therein as will be understood by those skilled in the art. In particular, the storage components include bins 140, drawers 142, and shelves 144 that are mounted within fresh food chamber 122. Bins 140, drawers 142, and shelves 144 are configured for receipt of stored items (e.g., beverages or solid food items) and may assist with organizing such food items. As an example, drawers 142 can receive fresh food items (e.g., vegetables, fruits, or cheeses) and increase the useful life of such fresh food items.

In optional embodiments, refrigerator appliance 100 also includes features for assisting a user with identifying food items positioned within fresh food chamber 122 or freezer chamber 124. The user can use such features, for example, to view food items stored (i.e., stored items) within fresh food chamber 122 or freezer chamber 124 or create an inventory of such stored items.

Figure 3:
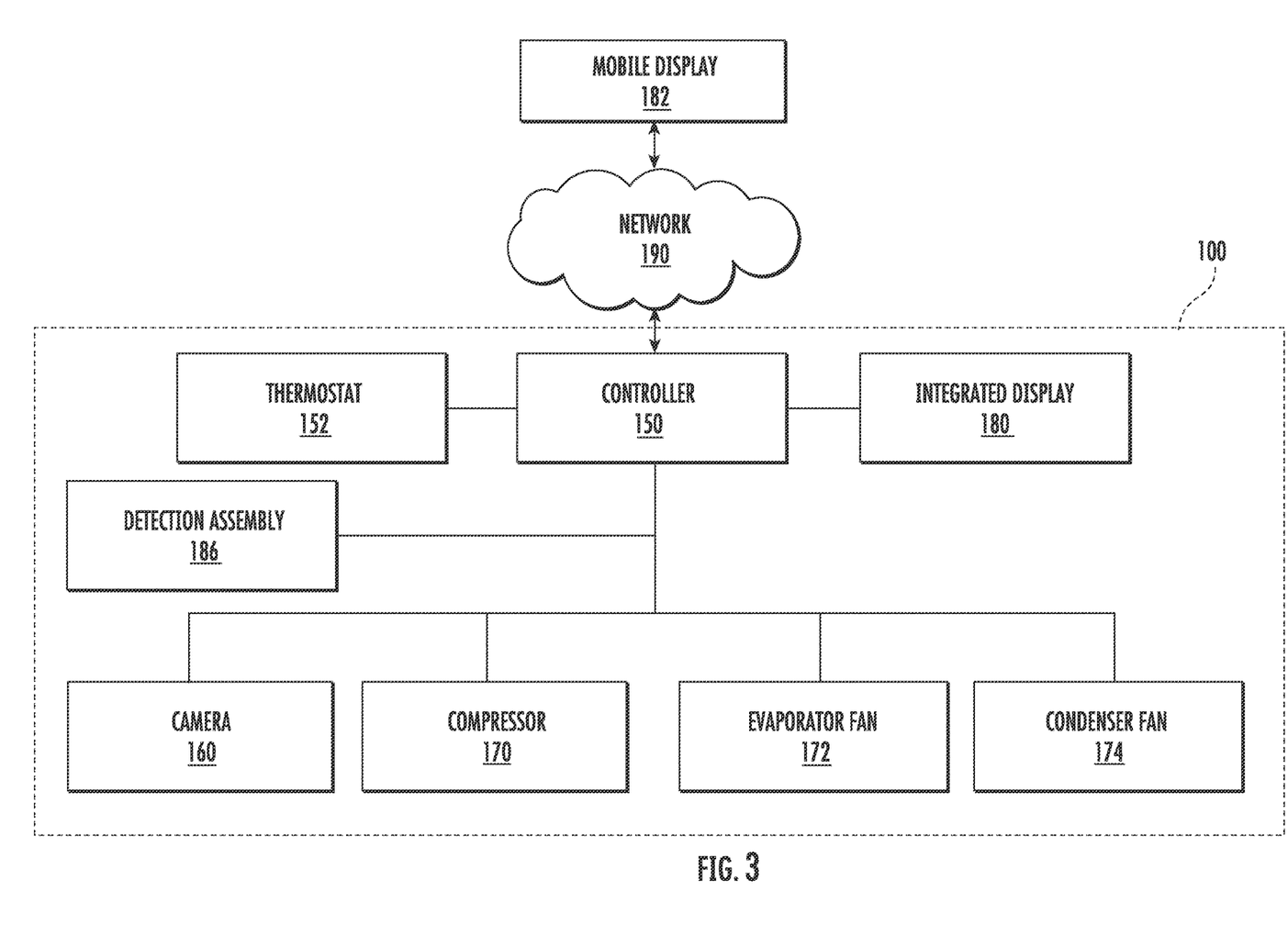
FIG. 3 provides a schematic view of a refrigerator appliance according to exemplary embodiments of the present disclosure.

Referring generally to FIGS. 1 through 3, FIG. 3 provides a schematic view of refrigerator appliance 100. Refrigerator appliance 100 includes a controller 150 that is operatively coupled to, or in communication with, components of a refrigeration system of refrigerator appliance 100 configured for cooling fresh food chamber 122 or freezer chamber 124. The components include a compressor 170, an evaporator fan 172, and a condenser fan 174. Controller 150 can selectively operate such components in order to cool fresh food chamber 122 or freezer chamber 124. Controller 150 is also in communication with a thermostat (e.g., a thermocouple or thermistor). The thermostat may be positioned in fresh food compartment 122 or freezer compartment 124. Controller 150 may receive a signal from the thermostat that corresponds to a temperature of fresh food compartment 122 or freezer compartment 124. Controller 150 may also include an internal timer for calculating elapsed time periods.

Controller 150 may include a memory and one or more microprocessors, CPUs or the like, such as general or special purpose microprocessors operable to execute programming instructions or micro-control code associated with operation of refrigerator appliance 100. The memory may represent random access memory such as DRAM, or read only memory such as ROM or FLASH. In some embodiments, the processor executes non-transitory programming instructions stored in memory. For certain embodiments, the instructions include a software package configured to operate appliance 100 or execute an operation routine (e.g., the exemplary method 600 or 700 described below with reference to FIG. 6 or 7). The memory may be a separate component from the processor or may be included onboard within the processor. Alternatively, controller 150 may be constructed without using a microprocessor (e.g., using a combination of discrete analog or digital logic circuitry;

such as switches, amplifiers, integrators, comparators, flip-flops, AND gates, and the like) to perform control functionality instead of relying upon software.

Controller 150 may be positioned in a variety of locations throughout refrigerator appliance 100. Input/output ("I/O") signals may be routed between controller 150 and various operational components of refrigerator appliance 100. One or more components of refrigerator appliance 100 may be in communication (e.g., electrical communication) with controller 150 via one or more conductive signal lines or shared communication busses. Additionally or alternatively, one or more components of refrigerator appliance 100 may be in communication (e.g., wireless communication) with controller 150 via one or more wireless signal bands.

In some embodiments, refrigerator appliance 100 also includes a camera or camera module 160. Camera 160 may be any type of device suitable for capturing a two-dimensional picture or image. As an example, camera 160 may be a video camera or a digital camera with an electronic image sensor [e.g., a charge coupled device (CCD) or a CMOS sensor]. When assembled, camera 160 is in communication (e.g., electric or wireless communication) with controller 150 such that controller 150 may receive a signal from camera 160 corresponding to the image captured by camera 160.

Generally, camera 160 is positioned on refrigerator appliance 100. In some embodiments, camera 160 is mounted within fresh food chamber 122 at a top portion thereof (e.g., proximal to top 101 and distal to bottom 102). For instance, camera 160 may be fixed to or directed through a top wall of an internal liner defining fresh food chamber 122. In such embodiments, camera 160 may be directed downward, as illustrated in FIG. 2.

In certain embodiments, camera 160 is directed toward one or more chilled chambers (e.g., fresh food chamber 122). For instance, camera 160 may be directed towards at least a portion of any particular one of or combination of drawers 142 and shelves 144. Thus, camera 160 can capture images of one of drawers 142, all of drawers 142, one of shelves 144, all of shelves 144, or any suitable combination thereof.

Figure 4:
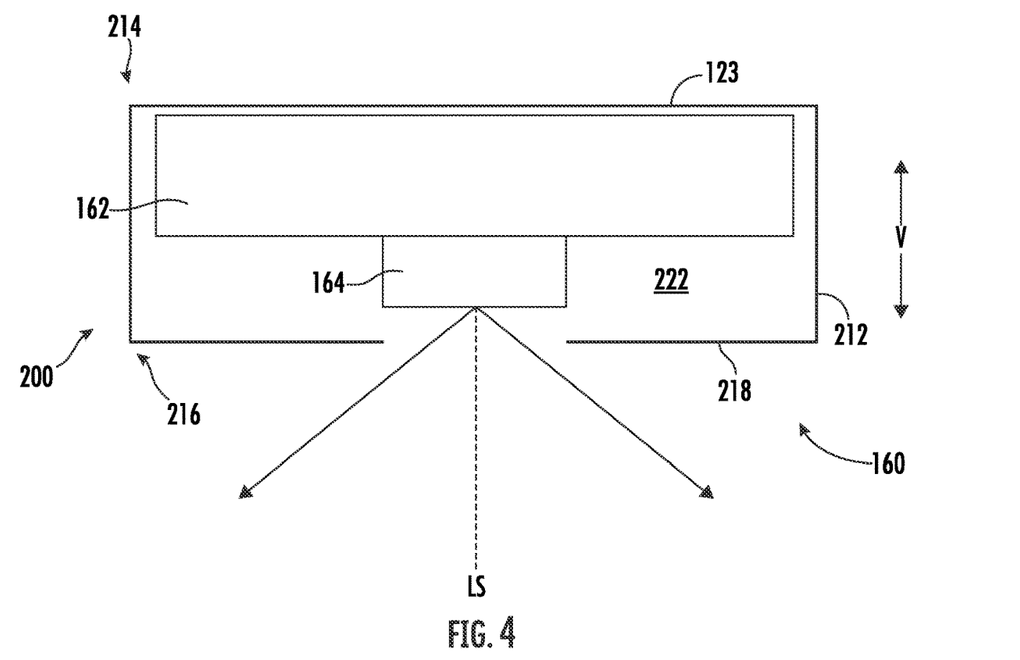
FIG. 4 provides a schematic sectional view of a camera module of a refrigerator appliance according to exemplary embodiments of the present disclosure.
Figure 5:
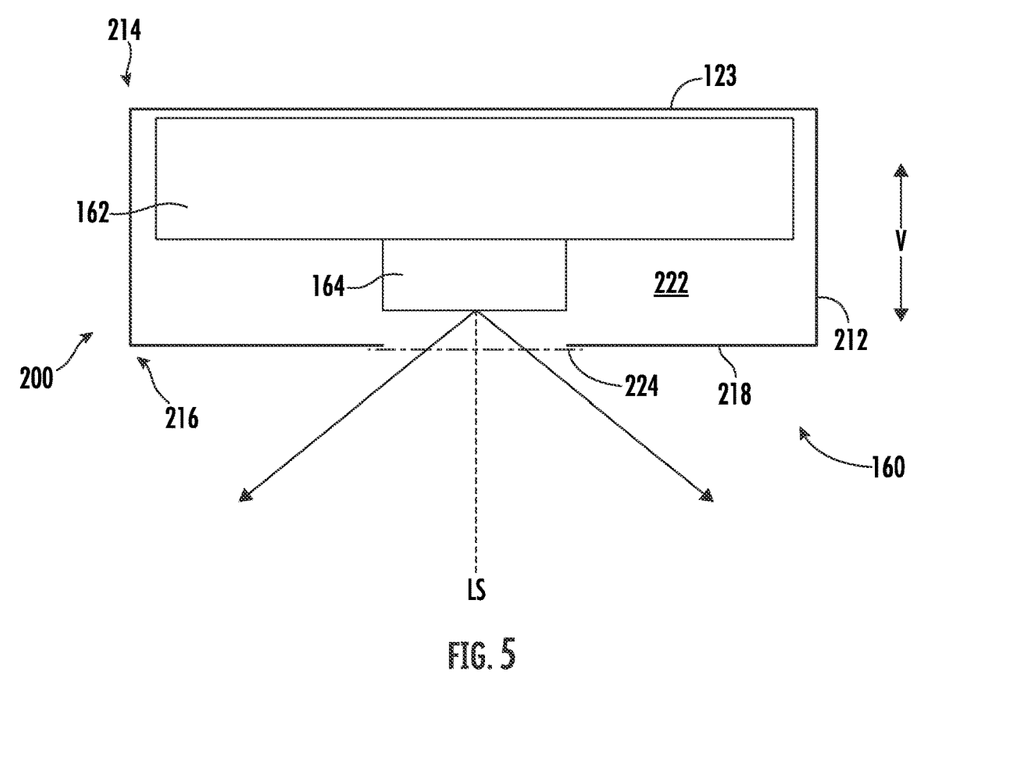
FIG. 5 provides a schematic sectional view of a camera module of a refrigerator appliance according to other exemplary embodiments of the present disclosure.

Turning briefly to FIGS. 4 and 5, in some embodiments, camera 160, including a circuit board 162 and a primary lens 164 thereof, is received within in a camera enclosure 210. As shown, camera enclosure 210 extends about at least a portion of camera 160 (e.g., on internal liner 123). For instance, an enclosure sidewall 212 may extend from internal liner 123 and about camera 160 (e.g., such that camera is radially surrounded by enclosure sidewall 212). Specifically, enclosure sidewall 212 may extend from an top end 214 to a bottom end 216. If mounted at a top portion of internal liner 123, bottom end 216 may be disposed below a bottommost surface of camera 160 (e.g., as defined at primary lens 164). From enclosure sidewall 212 (e.g., at bottom end 216) a front wall 218 extends radially inward. Front wall 218 may define an opening or aperture 220 along or aligned with the line of sight LS of camera 160 such that the viewing angle of camera 160 generally unobstructed and camera 160 is able to gather images of fresh food chamber 122 through aperture 220. Although FIG. 4 illustrates aperture 220 as an open void, FIG. 5 illustrates that aperture 220 may be covered by a transparent secondary lens 224 spaced apart from primary lens 164 to close or seal camera enclosure 210, and thereby prevent or restricting fluid communication between camera 160 and the chilled chamber in which it is mounted (e.g., fresh food chamber 122).

As shown generally in FIGS. 4 and 5, front wall 218 is spaced apart (e.g., vertically) from camera 160. When assembled, camera enclosure 210 generally defines an open volume 222 about camera 160. Camera enclosure 210 may be formed from a solid, nonpermeable material, such as a suitable polymer or metal. As camera 160 generates heat (e.g., due part to circuit resistance as a current is conducted to/from camera 160) capturing an image, such heat may be held or trapped within open volume 222, advantageously preventing the accumulation of condensation on primary lens 164 or secondary lens 224.

Returning generally to FIGS. 1 through 3, in certain embodiments, refrigerator appliance 100 includes an integrated display 180. Integrated display 180 may be mounted on refrigerator door 128 or at any other suitable location on refrigerator appliance 100. Integrated display 180 is in communication with controller 150 such that integrated display 180 may receive a signal from controller 150 corresponding to an image captured by camera 160. Integrated display 180 can receive such signal from controller 150 and present the image to a user visually. Integrated display 180 may include, for example, a liquid crystal display panel (LCD), a plasma display panel (PDP), or any other suitable mechanism for displaying an image (e.g., a projector).

In additional or alternative embodiments, refrigerator appliance 100 includes a network interface (not shown) that couples refrigerator appliance 100 (e.g., controller 150) to a network 190 such that refrigerator appliance 100 can transmit and receive information over network 190. Network 190 can be any wired or wireless network such as a WAN, LAN, or HAN.

In some such embodiments, refrigerator appliance 100 (e.g., controller 150) is in communication with a mobile display 182 via network 190. Mobile display 182 can be any device configured to communicate over network 190 and display images received therefrom. For example, mobile display 182 may be a computer, a smartphone, or a tablet. Mobile display 182 is in communication with controller 150 such that mobile display 182 may receive a signal from controller 150 (via network 190) corresponding to a user interface or an image captured by camera 160. Mobile display 182 can receive such signal from controller 150 and present one or more images to a user visually. Mobile display 182 may include, for example, a liquid crystal display panel (LCD), a plasma display panel (PDP), or any other suitable mechanism for displaying an image (e.g., a projector). Mobile display 182 can also include an interface (e.g., tactile inputs, such as buttons, or a graphical user interface) that allows mobile display 182 to initiate communications with refrigerator appliance 100 over network 190.

In certain embodiments, refrigerator appliance 100 includes a detection assembly 186 (e.g., to detect a user's presence). For instance, detection assembly 186 may include one or more sensors configured to directly detect a user's presence (e.g., by detecting a biometric or personalized marker corresponding to a specific individual user) or indirectly detecting a user's presence (e.g., by detecting movement of a door 128 or 130).

As an example, detection assembly 186 may include a forward-facing camera configured to recognize or identify a user's face based on a captured two-dimensional image.

As another example, detection assembly 186 may include a fingerprint imaging sensor configured to visually detect a user's fingerprint.

As yet another example, detection assembly 186 may include a signal-detection sensor configured to detect a device address over a wireless communications band (e.g., a BLE band using short-wavelength UHF radio waves in the ISM band from 2.4 to 2.485 GHz). The device address may be a programmed Bluetooth address of, for instance, mobile display 182. The detection assembly 186 may thus determine if and when a mobile display 182 is within close proximity to refrigerator appliance 100.

As still another example, detection assembly 186 may include a door switch (e.g., reed switch, pusher switch, Hall effect sensor, etc.) selectively engaged with a refrigerator door 128 to detect if/when the door 128 is in an open position. Such switches are generally understood and may, for instance, simultaneously control activation of a light for illuminating the fresh food chamber 122. Opening the refrigerator door 128 may thus activate the light and transmit a signal indicating detection of a user.

During use, such as during one or more image capture sequences, camera 160 may capture one or more two-dimensional images (e.g., as a video feed or series of sequential static images) that may be transmitted to the controller 150 (e.g., as a data signal). as is generally understood. With each image capture, a burst or pulse of heat may be generated by camera 160 from resistance of an electric current or voltage being transmitted through the various electrical components or circuits of the camera. Thus, the burst or pulses of heat may generally correspond to the sample or frame rate of a particular image capture sequence. The particular image capture sequence or further analysis of the received image signals at controller 150 may be varied or alternated (e.g., based on one or more conditions of the refrigerator appliance 100).

an example of use, a continuous anti-fog capture sequence may direct camera 160 to collect and transmit images (e.g., sequentially at a set sample rate, as defined in frames per second), even while the door(s) 128 is/are closed or no user is otherwise present. Generally, such images will be static (e.g., objects within the field of view of camera 160 will be unmoved or light within fresh food chamber 122 will be insufficient to collect anything more than a blank image). Once captured, the blank or static images may be discarded (e.g., at controller 150).

As an additional or alternative example of use, an open-door capture sequence may direct camera 160 to collect and transmit images (e.g., sequentially at a set sample rate different from the sample rate of the continuous anti-fog capture sequence), while one or more of doors 128 are open or a user is otherwise present. Generally, such images will be occupied (e.g., with information or data values for objects or light within the field of view of camera 160).

As a further additional or alternative example of use, a monitor sequence may direct camera 160 to collect and transmit images (e.g., sequentially at a set sample rate less than the sample rate of the continuous anti-fog capture sequence or the open-door sequence), even while the door(s) 128 is/are closed or no user is otherwise present. Generally, such images will be static (e.g., objects within the field of view of camera 160 will be unmoved or light within fresh food chamber 122 will be insufficient to collect anything more than a blank image). Once captured, the blank or static images may be discarded (e.g., at controller 150).

Once captured, certain images (e.g., occupied images) may be recorded (e.g., at least temporarily at controller 150), such that the occupied image may be transmitted for presentation (e.g., at integrated display 180 or remote display 182).

Additionally or alternatively, from the recorded occupied images, items (e.g., stored items, such as food, or non-stored items such as a user appendage, a shelf, a movable drawer, etc.) within the field of view (e.g., set field of view) for the camera 160 may be automatically identified by the controller 150 (e.g., to catalog items within fresh food chamber 122). As is understood, recognizing or identifying such items may be performed by edge matching, divide-and-conquer search, greyscale matching, histograms of receptive field responses, or another suitable routine (e.g., executed at the controller 150 based on one or more captured images from camera 160).

Further additionally or alternatively, from the recorded occupied images, one or more obscured portions (e.g., portions of an image that are obscured, obfuscated, or blocked from focus) may be identified by the controller 150. Such obscured portions may indicate condensation, dirt, or grime that has accumulated on the lens of camera 160. Recognizing or identifying such items may be performed by edge matching, divide-and-conquer search, greyscale matching, histograms of receptive field responses, or another suitable routine (e.g., executed at the controller 150 based on one or more captured images from camera 160). Moreover, one or more artificial intelligence or machine learning models (e.g., stored locally on controller 150) may be applied to the obscured portions such that controller 150 is able to distinguish, for example, a fog condition (e.g., corresponding to accumulated and transitory condensation on the lens of camera 160) and a static debris condition (e.g., corresponding to accumulated dirt, grime, or other generally static foreign object that may accumulate on the lens of camera 160). Optionally, the controller 150 may use images from multiple discrete events (e.g., open-door events) to determine the condition or identify the obscured portion (e.g., based on any changes in a particular obscured portion over time). As an example, changes in the shape or color of an obscured portion over time (e.g., over several discrete images or events), may indicate a fog condition as opposed to a static debris condition, which may correspond to a generally unchanging obscured portion. In either case, the obscured portion may cause a pervasive obfuscation condition that remains over time (e.g., across multiple discrete open-door events).

In some embodiments, camera 160 can be directed to one or more action responses based on the detection of an obscured portion or a pervasive obfuscation condition. As an example, camera 160 may be selectively directed to a continuous anti-fog capture sequence and the open-door capture sequence such that camera 160 remains active to generate heat at regular intervals (e.g., according to the sample rate of whichever image capture sequence is being performed at a given moment). Advantageously, such heat generation may prevent condensation or fog from accumulating (e.g., at a lens or secondary lens 224) within the line of sight LS of camera 160 and obfuscating images captured by camera 160. Optionally, an anti-fog capture sequence may be initiated based on the detection of an obscured portion or a pervasive obfuscation condition that is determined to be or potentially be (e.g., within a set percentage of likelihood) a fog condition. Additionally or alternatively, the open-door capture sequence may be initiated (e.g., thereby stopping or interrupting the continuous anti-fog capture sequence) by a predetermined engagement action, such as opening a door 128, detected movement within a chilled chamber (e.g., fresh food chamber 122), a user engaging or moving within range of detection assembly 186, providing a user input at a user interface or integrated display 180, etc. Further additionally or alternatively, an anti-fog capture sequence (e.g., second anti-fog capture sequence) may be initiated (e.g., thereby stopping or interrupting the open-door capture sequence) by a separate predetermined action or the absence of the engagement action that initiated the open-door capture sequence. Further additionally or alternatively, an anti-fog capture sequence (e.g., first or second anti-fog capture sequence) may be stopped or halted in response to an obfuscation condition that is determined to be or potentially be (e.g., within a set percentage of likelihood) a static debris condition.

In optional embodiments, camera 160 and controller 150 are configured to capture multiple (e.g., a pair of) sequential, two-dimensional images (e.g., at a set sample rate) as part of the anti-fog capture sequence or a separate monitor sequence. Generally, each two-dimensional image includes multiple pixels (e.g., arranged in a predefined grid), as is understood. Sequential images (e.g., a previously-captured image and a more-recently-captured image) of the same field of view or line of sight (e.g., the same region of the fresh food chamber 122) for the anti-fog capture sequence may be compared at the controller 150 prior to being discarded. For instance, the sequential images may be compared to each other or to a baseline value/value set (e.g., of pixel brightness or color). Changes in the sequential images or changes from the baseline value/value set may be detected to prompt a new image capture sequence. Specifically, detected changes, such as an elevated image value, may prompt the controller 150 to alternate from a continuous anti-fog sequence to an open-door capture sequence. An elevated image value may be detected by any suitable comparison or pixel characteristic, such as brightness value or a color value that might indicate a change in a brightness value or a detection of movement (e.g., from corresponding pixels in the sequential two-dimensional images).

As would be understood, each pixel within a two-dimensional image or set field of view has a brightness range. Optionally, the brightness range may be an RGB brightness range between, for example, 0 and 255 (e.g., wherein "0" is a minimum RGB pixel-brightness value and "255" is a maximum RGB pixel-brightness value). In certain embodiments, the brightness value for multiple pixels may be detected for a measurement of brightness. For instance, a mean brightness (Bm) value of the pixel-brightness values may be calculated for a corresponding two-dimensional image (or sub-region thereof). Additionally or alternatively, a deviation value may be calculated (e.g., as the brightness value) for multiple pixels in comparison to a balanced value. For instance, the brightness value (Vbr) of a captured image may be calculated as the absolute value of the mean brightness value minus a balanced vale (e.g., 125) over the balanced value. In other words, in some embodiments, brightness value may be expressed as $$Vbr=(|Bm-125|)/125.$$

In some embodiments, during an anti-fog capture sequence or a monitor sequence, an elevated brightness value may prompt an open-door capture sequence. For instance, the elevated brightness value may be an increase in brightness values between one or more pixels in a first captured image and one or more corresponding pixels in a second captured image. When the door 128 is closed, the brightness values of a corresponding captured image are relatively low. By contrast, when the door 128 is open, light from inside the fresh food chamber 122 may cause the brightness values of a corresponding captured image to be relatively high. Thus, a detected increase in brightness values (e.g., an increase of a set amount, relative percentage, etc.) may indicate the door 128 is open.

Figure 6:
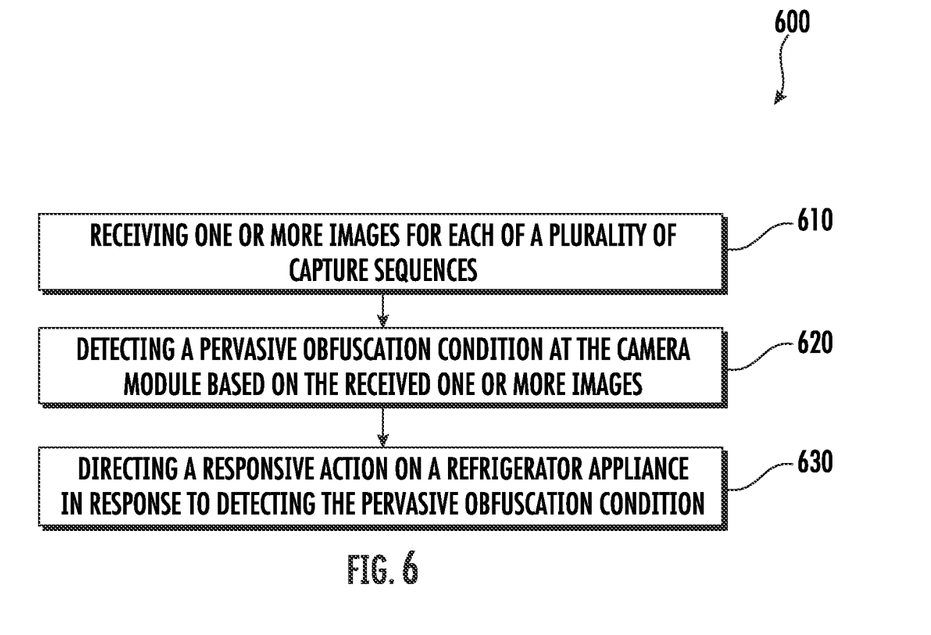
FIG. 6 provides a flow chart illustrating a method of operating a refrigerator appliance according to exemplary embodiments of the present disclosure.
Figure 7:
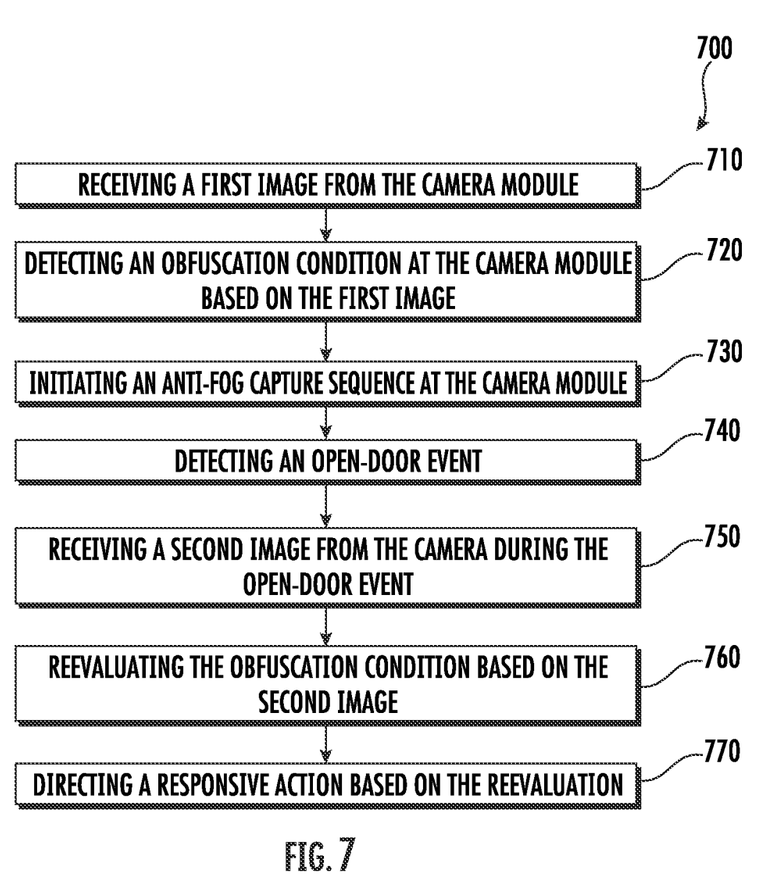
FIG. 7 provides a flow chart illustrating a method of operating a refrigerator appliance according to exemplary embodiments of the present disclosure.

Turning now to FIGS. 6 and 7, flow charts are provided of methods (e.g., 600 and 700) according to exemplary embodiments of the present disclosure. Generally, the methods 600 and 700 provides a method of operating a refrigerator appliance 100 (FIG. 1) that includes a camera 160, as described above. The method 600 or 700 can be performed, for instance, by the controller 150 (FIG. 3). For example, controller 150 may, as discussed, be in communication with camera 160 or detection assembly 186 (FIG. 3). During operations, controller 150 may send signals to and receive signals from camera 160 or detection assembly 186. Controller 150 may further be in communication with other suitable components of the appliance 100 to facilitate operation of the appliance 100 generally.

Advantageously, methods in accordance with the present disclosure may efficiently prevent condensation within a portion of a chilled chamber (e.g., without requiring or using a dedicated heater or heating element). For instance, the disclosed methods may permit a camera's own heat generation to constantly prevent the accumulation of condensation (e.g., on a lens of camera) as the refrigerator appliance is operated. Additionally or alternatively, the present methods may facilitate the efficient and effective management of captured images (e.g., such that a controller is not overwhelmed by stored or received data).

FIGS. 6 and 7 depicts steps performed in a particular order for purpose of illustration and discussion. Those of ordinary skill in the art, using the disclosures provided herein, will understand that the methods are not mutually exclusive and the steps of any of the methods disclosed herein can be modified, adapted, rearranged, omitted, or expanded in various ways without deviating from the scope of the present disclosure (except as otherwise described or required).

At 610, the method 600 includes receiving one or more images for each of a plurality of capture sequences. In other words, at least one image may be received from a plurality of discrete capture sequences. Each capture sequence may be executed at a different point in time. For instance, each image capture sequence may correspond to a unique open-door event or other sequence in which a captured image is occupied (i.e., not blank or entirely black). In exemplary embodiments, the method 600 includes initiating each of the plurality of capture sequences in response to a discrete door opening event. For instance, one or more (e.g., each or some) of the plurality of capture sequences may be an open-door capture sequence. As noted above, a discrete door opening event may be detected, for instance, based on an image value or a signal from a separate sensor or switch. In turn, the discrete door opening event of each of the plurality of capture sequence may be detected based on an elevated image value in a received static image signal. Additionally or alternatively, the discrete door opening event of each of the plurality of capture sequence may be detected based on receiving an open signal from the door switch.

Generally, the open-door capture sequence may direct images to be captured sequentially at the camera module. For instance, two-dimensional images may be captured at a set sample rate that is greater than the sample rate of the anti-fog capture sequence. The sample rate of the open-door capture sequence may thus be relatively high, such as between 25 frames per second and 120 frames per second. Additionally or alternatively, the sample rate may be greater than or equal to 30 frames per second. Further additionally or alternatively, the sample rate may be around 60 frames per second.

As would be understood in light of the present disclosure, for each capture sequence, one or more two-dimensional images may be captured at a set sample rate (e.g., according to the type of capture sequence being executed). In turn, such two-dimensional images may be recorded (e.g., for analysis or display).

At 620, the method 600 includes detecting a pervasive obfuscation condition at the camera module based on the received one or more images. In particular, one or more obscured portions may be recognized or identified in one or more of the images. Additionally or alternatively, one or more artificial intelligence or machine learning models (e.g., stored locally on controller 150) may be applied the two-dimensional images. From such application, an obscured portions may be recognized or identified. The obscured portion may optionally be tracked or identified across multiple images from separate or discrete capture sequences (e.g., over time). Additionally or alternatively, one or more models may identify the obscured portion as corresponding to a pervasive obfuscation condition (e.g., fog condition or static debris condition). In some such embodiments, a predictive score may be assigned to one or more images from the one or more models to predict the likelihood that a particular image indicates a pervasive obfuscation condition, such as a fog condition or a static debris condition (e.g., based on the shape, color, or change in an identified obscured portion within one or more images). Such models may be generally understood or assembled by one of ordinary skill in the art in light of the present disclosure. Optionally, a predicative score above a set threshold for a corresponding pervasive obfuscation condition may lead to or confirm determination of the pervasive obfuscation condition.

At 630, the method 600 includes directing a responsive action on the refrigerator appliance in response to detecting the pervasive obfuscation condition. In other words, in response to 620, a corresponding responsive action may be initiated automatically (e.g., without direct user input or approval).

In some embodiments, the pervasive obfuscation condition is a fog condition (e.g., corresponding to persistent condensation accumulated on the lens of the camera module, such as might arise if a dedicated heater is not present or has malfunctioned). Under such circumstances, 630 may include initiating a continuous anti-fog capture sequence at the camera module. Generally, the continuous anti-fog capture sequence may direct images to be captured sequentially at the camera module. For instance, two-dimensional images may be captured at a set sample rate. The sample rate of the anti-fog capture sequence may be relatively low, such as between 1 frame per second and 25 frames per second. Additionally or alternatively, the sample rate of the anti-fog capture sequence may be around 10 frames per second. In turn, the initiated anti-fog capture sequence may lead to receiving a static image signal from the camera module during the continuous anti-fog capture sequence. As described above, images captured at the camera may be transmitted to (and received by) the controller of refrigerator appliance (e.g., as such images are captured). The static image signal may thus correspond to an image captured at the camera module as part of the continuous anti-fog capture sequence. discarding the received static image signal. Generally, the continuous anti-fog capture sequence may capture images of the chilled chamber when little or no information is expected to be discernable. Thus, such images (as provided with an image signal) may be deleted or discarded from the controller. Optionally, the static image signal may be discarded immediately upon receipt at the controller. Alternatively, the static image signal may be discarded following (e.g., in response to) an ephemeral evaluation, such as to detect an elevated pixel value or compare a pair of sequential image signals.

Separate from or in addition to the anti-fog capture sequence, determination of a fog condition may cause 630 to include projecting an alert message corresponding to the fog condition at the user interface or display of the refrigerator appliance (e.g., display on the cabinet or mobile display of a user device). Generally, the alert message may include text or images indicating the presence of the fog condition. Optionally, static images or video clips may be provided to illustrate how the fog condition may be addressed or resolved (e.g., by cleaning or repairing the camera module). Additionally or alternatively, an alert signal may be transmitted to a third-party remote server (e.g., in order to notify a serviceperson of the fog condition), as would be understood, as or as part of the responsive action.

In some embodiments, the pervasive obfuscation condition is a static debris condition (e.g., corresponding to accumulated dirt, grime, or other generally static foreign object accumulated on the lens of the camera module). Under such circumstances, 630 may include projecting an alert message corresponding to the static debris condition at the user interface or display of the refrigerator appliance (e.g., display on the cabinet or mobile display of a user device). Generally, the alert message may include text or images indicating the presence of the static debris condition. Optionally, static images or video clips may be provided to illustrate how the static debris condition may be addressed or resolved (e.g., by cleaning or repairing the camera module). Additionally or alternatively, an alert signal may be transmitted to a third-party remote server (e.g., in order to notify a serviceperson of the static debris condition), as would be understood, as or as part of the responsive action.

Turning now to FIG. 7, at 710, the method 700 includes receiving a first image from the camera module. For instance, as part of a capture sequence, one or more images to be captured sequentially at the camera module. Optionally, two-dimensional images may be captured at a set sample rate. Such images may be occupied images captured, as an example, as part of an open-door capture sequence.

In some such embodiments, the first image is captured in response to a detected open-door event. As noted above, a discrete door opening event may be detected, for instance, based on an image value or a signal from a separate sensor or switch. In turn, the discrete door opening event of each of the plurality of capture sequence may be detected based on an elevated image value in a received static image signal. Additionally or alternatively, the discrete door opening event of each of the plurality of capture sequence may be detected based on receiving an open signal from the door switch.

At 720, the method 700 includes detecting an obfuscation condition at the camera module based on the received first image. In particular, an obscured portion may be recognized or identified within the first image, as described above.

At 730, the method 700 includes initiating an anti-fog capture sequence at the camera module. Specifically, 730 may be in response to 720. Optionally, 730 may require the door to be in a closed position (e.g., as indicated by the end of an open-door event). Generally, the continuous anti-fog capture sequence may direct images to be captured sequentially at the camera module. For instance, two-dimensional images may be captured at a set sample rate. The sample rate of the anti-fog capture sequence may be relatively low, such as between 1 frame per second and 25 frames per second. Additionally or alternatively, the sample rate of the anti-fog capture sequence may be around 10 frames per second. In turn, the initiated anti-fog capture sequence may lead to receiving a static image signal from the camera module during the continuous anti-fog capture sequence. As described above, images captured at the camera may be transmitted to (and received by) the controller of refrigerator appliance (e.g., as such images are captured). The static image signal may thus correspond to an image captured at the camera module as part of the continuous anti-fog capture sequence. discarding the received static image signal. Generally, the continuous anti-fog capture sequence may capture images of the chilled chamber when little or no information is expected to be discernable. Thus, such images (as provided with an image signal) may be deleted or discarded from the controller. Optionally, the static image signal may be discarded immediately upon receipt at the controller. Alternatively, the static image signal may be discarded following (e.g., in response to) an ephemeral evaluation, such as to detect an elevated pixel value or compare a pair of sequential image signals.

At 740, the method 700 includes detecting an open-door event following 730. As noted above, a discrete door opening event may be detected, for instance, based on an image value or a signal from a separate sensor or switch. In turn, the discrete door opening event of each of the plurality of capture sequence may be detected based on an elevated image value in a received static image signal. Additionally or alternatively, the discrete door opening event of each of the plurality of capture sequence may be detected based on receiving an open signal from the door switch.

At 750, the method 700 includes receiving a second image from the camera during the open-door event. For instance, as part of a capture sequence (e.g., new or corresponding open-door sequence), one or more images to be captured sequentially at the camera module. Optionally, two-dimensional images may be captured at a set sample rate. Such images may be occupied images captured, as an example, as part of an open-door capture sequence.

At 760, the method 700 includes reevaluating the obfuscation condition based on the received second image. In particular, the second image may be analyzed (e.g., using an included model) to detect an obscured portion (e.g., to determine if the same obscured condition from the first image is present, if/how it has changed, etc.). Optionally, changes to color or shape or the emergence of a new obscured portion may indicate the obscured portion is linked to a fog condition. Additionally or alternatively, de minimis (e.g., within a set percentage or range) changes to the obscured portion between the first and second images may indicate a static debris condition. The reevaluation may thus determine a pervasive obfuscation condition is present.

At 770, the method 700 includes directing a responsive action based on the reevaluation. As an example, based on a reevaluation determination of a fog condition (e.g., corresponding to persistent condensation accumulated on the lens of the camera module, such as might arise if a dedicated heater is not present or has malfunctioned), 770 may include initiating a continuous anti-fog capture sequence at the camera module. Generally, the continuous anti-fog capture sequence may direct images to be captured sequentially at the camera module. For instance, two-dimensional images may be captured at a set sample rate. The sample rate of the anti-fog capture sequence may be relatively low, such as between 1 frame per second and 25 frames per second. Additionally or alternatively, the sample rate of the anti-fog capture sequence may be around 10 frames per second. In turn, the initiated anti-fog capture sequence may lead to receiving a static image signal from the camera module during the continuous anti-fog capture sequence. As described above, images captured at the camera may be transmitted to (and received by) the controller of refrigerator appliance (e.g., as such images are captured). The static image signal may thus correspond to an image captured at the camera module as part of the continuous anti-fog capture sequence. discarding the received static image signal. Generally, the continuous anti-fog capture sequence may capture images of the chilled chamber when little or no information is expected to be discernable. Thus, such images (as provided with an image signal) may be deleted or discarded from the controller. Optionally, the static image signal may be discarded immediately upon receipt at the controller. Alternatively, the static image signal may be discarded following (e.g., in response to) an ephemeral evaluation, such as to detect an elevated pixel value or compare a pair of sequential image signals.

As an additional or alternative example, based on a reevaluation determination of a fog condition (e.g., corresponding to persistent condensation accumulated on the lens of the camera module, such as might arise if a dedicated heater is not present or has malfunctioned), 770 may include projecting an alert message corresponding to the fog condition at the user interface or display of the refrigerator appliance (e.g., display on the cabinet or mobile display of a user device). Generally, the alert message may include text or images indicating the presence of the fog condition. Optionally, static images or video clips may be provided to illustrate how the fog condition may be addressed or resolved (e.g., by cleaning or repairing the camera module). Additionally or alternatively, an alert signal may be transmitted to a third-party remote server (e.g., in order to notify a serviceperson of the fog condition), as would be understood, as or as part of the responsive action.

As a further additional or alternative example, based on a reevaluation determination of a static debris condition (e.g., corresponding to accumulated dirt, grime, or other generally static foreign object accumulated on the lens of the camera module), 770 may include projecting an alert message corresponding to the static debris condition at the user interface or display of the refrigerator appliance (e.g., display on the cabinet or mobile display of a user device). Generally, the alert message may include text or images indicating the presence of the static debris condition. Optionally, static images or video clips may be provided to illustrate how the static debris condition may be addressed or resolved (e.g., by cleaning or repairing the camera module). Additionally or alternatively, an alert signal may be transmitted to a third-party remote server (e.g., in order to notify a serviceperson of the static debris condition), as would be understood, as or as part of the responsive action.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A refrigerator appliance comprising:
   a cabinet defining a chilled chamber;
   a door being rotatably hinged to the cabinet to provide selective access to the chilled chamber;
   a camera module mounted to the cabinet within the chilled chamber; and
   a controller operably coupled to the camera module, the controller being configured to initiate an operation routine comprising
   initiating an anti-fog capture sequence,
   receiving one or more images for each of a plurality of capture sequences,
   detecting a pervasive obfuscation condition at the camera module based on the received one or more images and the anti-fog capture sequence, detecting the pervasive obfuscation condition following the anti-fog capture sequence, and
   directing a responsive action on the refrigerator appliance in response to detecting the pervasive obfuscation condition.

2. The refrigerator appliance of claim 1, wherein the pervasive obfuscation condition is a fog condition, and
   wherein directing the responsive action comprises
   initiating a continuous anti-fog capture sequence at the camera module,
   receiving a static image signal from the camera module during the continuous anti-fog capture sequence, and
   discarding the received static image signal.

3. The refrigerator appliance of claim 2, wherein the anti-fog capture sequence has a sample rate of between 1 and 25 frames per second.

4. The refrigerator appliance of claim 1, wherein the pervasive obfuscation condition is a static debris condition, and
   wherein directing the responsive action comprises
   projecting an alert message corresponding to the static debris condition at a user interface of the refrigerator appliance.

5. The refrigerator appliance of claim 1, wherein the operation routine further comprises
   initiating each of the plurality of capture sequences in response to a discrete door opening event.

6. The refrigerator appliance of claim 5, wherein the discrete door opening event of each of the plurality of capture sequence is detected based on an elevated image value in a received static image signal.

7. The refrigerator appliance of claim 5, further comprising a door switch in selective communication with the door, wherein the discrete door opening event of each of the plurality of capture sequence is detected based on receiving an open signal from the door switch.

8. The refrigerator appliance of claim 1, wherein the camera module is received within a camera enclosure comprising a front wall defining an aperture along a line of sight of the camera module, and wherein the front wall is spaced apart from the camera module.

9. A method of operating a refrigerator appliance comprising a camera module mounted within a chilled chamber, the method comprising:
   initiating an anti-fog capture sequence;
   receiving one or more images for each of a plurality of capture sequences;
   detecting a pervasive obfuscation condition at the camera module based on the received one or more images and the anti-fog capture sequence, detecting the pervasive obfuscation condition following the anti-fog capture sequence; and
   directing a responsive action on the refrigerator appliance in response to detecting the pervasive obfuscation condition.

10. The method of claim 9, wherein the pervasive obfuscation condition is a fog condition, and
    wherein directing the responsive action comprises
    initiating a continuous anti-fog capture sequence at the camera module,
    receiving a static image signal from the camera module during the continuous anti-fog capture sequence, and
    discarding the received static image signal.

11. The method of claim 10, wherein the anti-fog capture sequence has a sample rate of between 1 and 25 frames per second.

12. The method of claim 9, wherein the pervasive obfuscation condition is a static debris condition, and
    wherein directing the responsive action comprises
    projecting an alert message corresponding to the static debris condition at a user interface of the refrigerator appliance.

13. The method of claim 9, further comprising:
    initiating each of the plurality of capture sequences in response to a discrete door opening event.

14. The method of claim 13, wherein the discrete door opening event of each of the plurality of capture sequence is detected based on an elevated image value in a received static image signal.

15. The method of claim 13, wherein the discrete door opening event of each of the plurality of capture sequence is detected based on receiving an open signal from a door switch.

16. The method of claim 9, wherein the camera module is received within a camera enclosure comprising a front wall defining an aperture along a line of sight of the camera module, and wherein the front wall is spaced apart from the camera module.

17. A refrigerator appliance comprising:
    a cabinet defining a chilled chamber;
    a door being rotatably hinged to the cabinet to provide selective access to the chilled chamber;
    a camera module mounted to the cabinet within the chilled chamber; and
    a controller operably coupled to the camera module, the controller being configured to initiate an operation routine comprising
    receiving a first image from the camera module,
    detecting an obfuscation condition at the camera module based on the received first image,
    initiating an anti-fog capture sequence at the camera module,
    detecting an open-door event,
    receiving a second image from the camera during the open-door event,
    reevaluating the obfuscation condition based on the received second image, and
    directing a responsive action based on the reevaluation.

18. The refrigerator appliance of claim 17, wherein directing the responsive action comprises
    initiating a continuous anti-fog capture sequence at the camera module,
    receiving a static image signal from the camera module during the continuous anti-fog capture sequence, and
    discarding the received static image signal.

19. The refrigerator appliance of claim 17, wherein directing the responsive action comprises
projecting an alert message corresponding to the obfuscation condition at a user interface of the refrigerator appliance.

\* \* \* \* \*